May 16, 1950 G. D. BOWER 2,508,010
THERMAL LIMIT VALVE
Filed June 9, 1945
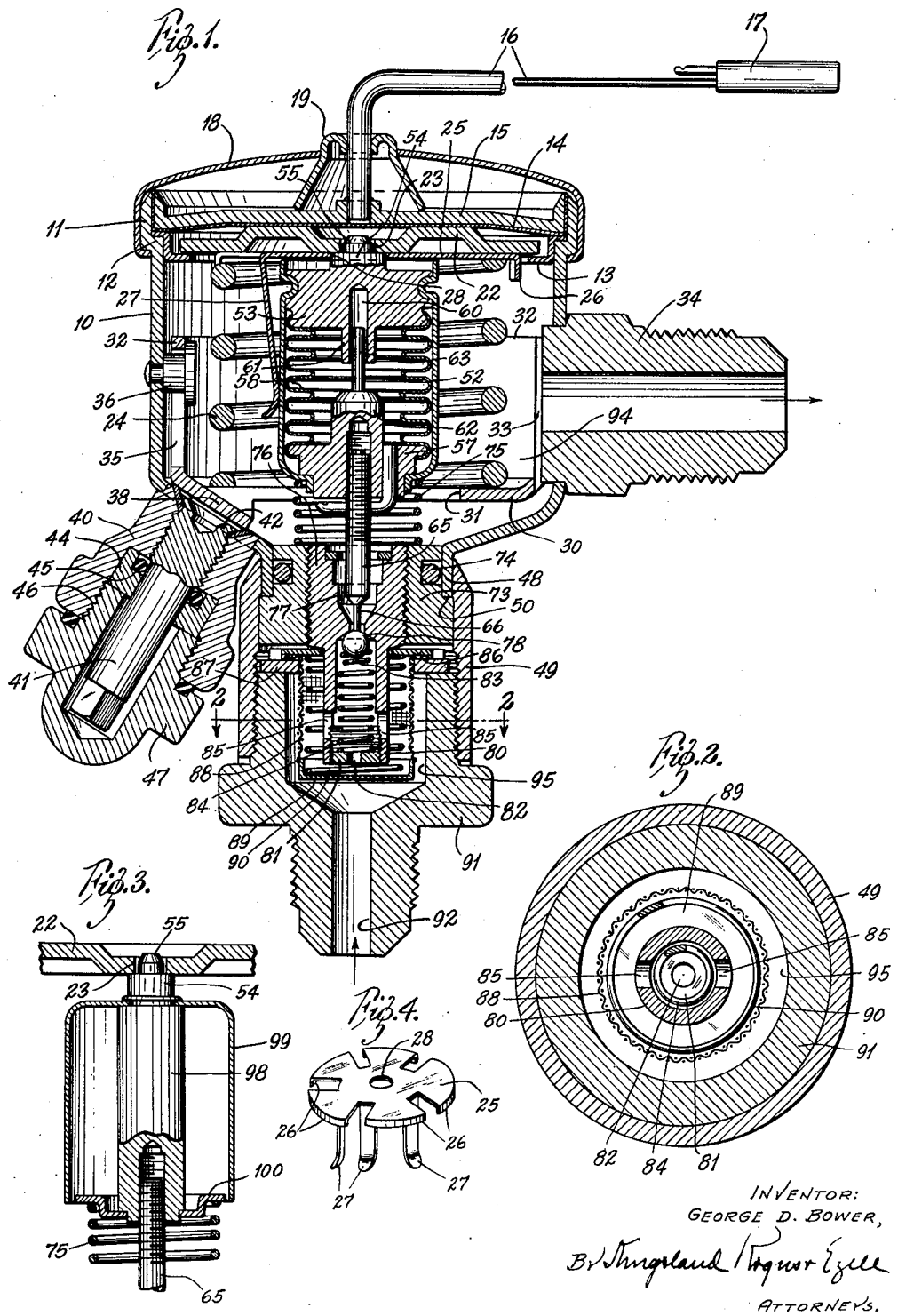
INVENTOR:
GEORGE D. BOWER,
By Kingsland Rogner Ezell
ATTORNEYS.

Patented May 16, 1950

2,508,010

UNITED STATES PATENT OFFICE 2,508,010

THERMAL LIMIT VALVE

George D. Bower, University City, Mo., assignor to Alco Valve Company, University City, Mo., a corporation of Missouri Application June 9, 1945, Serial No. 598,543

22 Claims. (Cl. 137—153)

The present invention relates to a thermal limit valve. More particularly, it has to do with a valve that is operated in response to temperature and pressure conditions, but which will be throttled when certain pressure conditions, to which the valve is subjected, exceed a predetermined pressure value.

It is an object of the invention to provide a valve of the foregoing kind.

It is a particular object of the invention to provide a valve for use with refrigeration systems, which valve will maintain a constant superheat in the refrigerant, and which will hold a maximum pressure limit on the refrigerant entering the evaporator. That is to say, it is an object of this invention to provide a thermal valve with a pressure-responsive means adapted to throttle the valve when the pressure in the evaporator exceeds a predetermined amount, and thereby to prevent such conditions as an overload on the compressor motor at the time of the start of any refrigeration cycle.

It is a further object of this invention to provide motor and compressor overload protection of the foregoing kind, with no decrease in the standard thermal valve operating efficiency. It is an object of this invention to attain the foregoing without the necessity of the familiar precautions necessary for application of gas-charged valves.

It is a further object to provide a valve of the foregoing kind with a pressure-responsive shut-off means disposed to respond to excessive evaporator pressures, wherein the cut-off point is unaffected by the superheat setting.

It is a further object to provide a valve of this kind in which the power assembly, the pressure-responsive means and the other elements are easily assembled in the field, to permit maximum assembly flexibility with minimum stock. More particularly, it is an object to provide a thermal valve wherein the thermal operating means may be assembled as a first unit, the pressure cut-off may be assembled as a second unit, and a valve mechanism may be assembled as a third unit, and then all of the parts put together.

A further object is to provide a valve of the foregoing kind wherein the superheat setting mechanism is integral with the power assembly, but independent of the pressure-responsive cut-off mechanism.

A further object is to provide a valve of the foregoing kind wherein the pressure-responsive cut-off may be readily omitted and standard thermal valve operation obtained.

Other objects will appear from the following description and from the drawings.

In the drawings:

Fig. 1 is a transverse diametrical section through the valve;

Fig. 2 is a horizontal section on the line 2—2 of Fig. 1;

Fig. 3 is a view of a part of Fig. 1, showing a substitution of a solid cartridge for transmission of diaphragm flexing to the valve in place of the pressure-responsive cartridge; and Fig. 4 is a perspective view of an element of the thermal unit.

The valve includes an upper cylindrical housing member 10. This housing has an offset upstanding cylindrical flange 11, which provides a shelf 12. Upon this shelf is mounted a limit member 13. This limit member 13 is in the form of a flanged ring with its upper flange resting upon the shoulder 12 and a lower flange extending inward to form a ledge. Above it is disposed a diaphragm 14 the edges of which are upturned so that the diaphragm may be inserted within the flange 11 to be supported by the ring 13 on the shoulder 12, with the upstanding edges resting upon and sealed to the inner surface of the flange 11 on the housing 10. The diaphragm 14 is held in place by a closure plate 15, which has an upturned outer edge that firmly clamps the upstanding edge of the diaphragm against the flange 11, and the outer rim of the same against the ring 13 at the shoulder 12. All of these parts are sealed together.

A tube 16 is introduced into the center of the plate 15 to convey the thermostat charge to the diaphragm chamber. The tube 16 is connected to a bulb 17 that is adapted to be disposed at a suitable place, the temperature of which is to effect control of the valve. Normally, in a refrigeration system, the bulb 17 is disposed adjacent the outlet of the evaporator, and contains a volatile liquid charge.

A cap member 18 is secured around the flange 11 of the housing 10. It has a central opening in which a cone 19 is disposed to support the center of the cap 18 and to guard the capillary 16 against being broken. The cone 19 has a central opening to receive the tube 16.

Beneath the diaphragm 14 is a buffer plate 22. This buffer plate has an offset ring portion around it which is normally in engagement with the bottom of the diaphragm 14. The outer edges of the buffer plate 22 extend above the bottom edges of the ring 13 so that downward movement of the buffer plate 22 is limited by this ring 13. The buffer plate also has a central opening 23 through it for a purpose to be described.

A compression spring 24 is disposed within the housing 10 to act against the downward movement of the diaphragm 14. This spring impinges at its upper end against a disc 25, shown in greater detail in Fig. 4. This disc has a downturned flange 26 around the major part of its edge, to limit the spring 24 against lateral displacement. The disc 25 also has a plurality of downturned arms 27 that form a cage for the reception of a force-transmitting cartridge to be described. The arms 27 are resilient so that the cartridge may be inserted between them and held against lateral movement, the arms having sufficient resiliency to permit reasonable lateral movement to take up irregularities in contour. The disc 25 also has a central opening 28 therethrough.

The spring 24 is supported at its lower end in a cup member 30. The bottom of the cup member 30 is disposed adjacent the inwardly extended bottom of the housing 10. This bottom of the cup member 30 is provided with an opening 31 for a purpose to be described. The upstanding walls 32 of the cup member extend inside the walls of the housing 10 and are cut away with a slot at 33 that permits insertion of the cup member into the housing over an outlet fitting 34 that is sealed into the wall of the housing 10. The cup member 30 also has an opposite slot 35 that engages over a pin or button 36 that may be soldered into the wall of the housing 10. The button 36 has a head on it to limit the movement of the adjacent part of the wall 32 away from the wall of the housing 10. This button also prevents rotation of the cup member 30 within the housing, but it does not prevent vertical or axial movement of the cup member.

The cup member 30 has a downwardly deflected flange 38 depressed from its bottom part. This depression 38 extends adjacent the inner downwardly tapering wall of the housing 10 at one point therein. Adjacent it, the housing is provided with an internally threaded fitting 40, receiving a screw member 41. This screw member has an inner end 42 that abuts the depression 38, so that, when the screw 41 is turned inwardly, it will press upon the depression 38 and move the entire cup member 30 upwardly. This increases the compression of the coil spring 24. Of course, downward movement of the screw 41 releases the compression of the coil spring. In this action, the button 36 prevents rotation of the cup member 30. As the screw 41 provides an eccentric support for the bottom of the cup member 30, the head of the button 36 is required to prevent warping of the cup member within the housing. It will be understood that this adjustment of the screw 41 adjusts the superheat value at which the valve operates.

Within the fitting 40, there is provided a packing member 44 supporting a packing ring 45. The packing support 44 is inserted with a pressed fit into an internally threaded opening 46 within the fitting 40. This opening, in turn, receives a combination plug and sealing cap 47, that seals off the whole fitting.

The housing 10 has a depending circular flange 48, around which an internally threaded cylindrical fitting 49 is permanently attached. It will be seen that this arrangement forms a shoulder 50 below the flange 48. The flange and the fitting 49 provide a bottom opening into the housing 10.

As will be shown hereafter, the foregoing parts comprise the major parts of an individually assemblable thermal unit.

The second unit is a capsule arrangement disposed between the diaphragm and the valve itself. In the embodiment shown in Fig. 1, this capsule is in the form of a bellows construction and valve operating device. It includes an outer cup 52, into the upper end of which a bellows head 53 is attached. The head 53 has a first projection 54 therein that fits through the opening 28 of the disc 25. Above this, there is a second projection 55 that fits through the opening 23 in the buffer plate 22 to prevent the head 54 from having excessive lateral movement.

The bottom of the cup 52 is inturned and has an opening therethrough. This opening receives the projecting part of a bottom bellows head 57 and limits the downward movement of this head relative to the cup. A gas-charged bellows 58 is sealed at one end to the upper head 53 and at its lower end to the lower head 57.

The upper head 53 has a central bore 60 therein and a downwardly projecting circular flange 61. The lower bellows has an upstanding lug 62, and from the upper end of this lug 62 a pin 63 projects into the opening 60 of the upper head. It will be seen that the pin 63 guides the two heads to maintain them in axial alignment; and it will also be seen that, upon compression of the bellows, the lug 62 may abut against the depending flange 61 and to limit the compression of the bellows. As already noted, the expansion of the bellows is limited by the impingement of the lower head 57 against the bottom wall of the cup 52.

The lower head 57 likewise supports a valve operating stem 65 that is threaded into the bellows head 57 for calibration purposes. The valve operating stem 65 projects down through the central opening within the bottom of the housing member 10, and, at its lower end, has a constricted pin 66 projecting downwardly.

The foregoing constitute the principal parts of the pressure-responsive capsule unit.

The valve unit includes a plug 73, of the shape shown, inserted from the bottom of the cylinder 49 upwardly, so that it engages against the shoulder 50 and is held thereby against further upward movement. The plug 73 carries a packing ring 74 that seals off the interior of the housing 10 from the parts therebelow with respect to leakage around the outer edge of the plug 73. The plug 73 forms a lower rest for a coil spring 75 that acts upwardly on the bottom of the cup 52 of the capsule unit to hold it against the diaphragm assembly.

The plug 73 has an internally threaded axial bore therethrough, into which is fitted a valve seat insert member 76. This valve seat member has an irregularly shaped bore 77 through it which is constricted down to provide a valve seat 78, that forms a refrigerant expansion port. The narrow portion 66 of the valve stem 65 fits through the port adjacent the valve seat 78. The plug 76 has a downwardly depending cylindrical flange 80 comprising a valve cage. At its lower end, the cage is internally threaded to receive a disc 81 having a port 82 therethrough. This disc forms a bottom for the flange 80. The cage contains a ball valve 83 adapted to cooperate with the valve seat 78. The ball is urged toward the seat by a coil spring 84 that acts upwardly upon the valve 83. Lateral cross holes 85 are provided in the cage 80 to insure free flow thereinto.

Beneath the plug 76, there is a spring washer 86. Below the washer is a strainer ring 87, to which is attached a cylindrical strainer 88, closed at its bottom by a disc-like strainer head 89. A coil spring 90 acts between the ring 86 (and hence the plug 73) and the head 89 to maintain the strainer expanded. Preferably the strainer ring 87, the strainer 88 and the head 89 are a unit.

An inlet fitting 91 is externally threaded to fit within the cylinder 49. It has an inlet passage 92. At its upper end, the inlet fitting 91 impinges upon the strainer ring 87, which, in turn, abuts the washer 86; and the latter, in turn, abuts the lower shoulder on the plug 73. As the plug 76 is screwed into the member 73, it will be seen that the insertion of the fitting 91 holds all of the mentioned parts in their assembled relationship.

The assembly thus described provides an outlet chamber 94 within the upper part of the housing 10, separated by a partition formed by the plug 73 and the insert 76 from an inlet chamber 95.

Fig. 3 shows a substitute capsule for the mechanism of the bellows cup 52. In it, there is a solid post 98 that has the upper projections 54 and 55 similar to those of the original type. The post 98 is surrounded by a downturned cup member 99, which is engageable within the arms 27 of the disc 25. The lower end of the post receives a flanged centering washer 100, against which the spring 75 impinges to urge the assembly upwardly into contact with the buffer plate.

Operation

The operation of the device is as follows:

For purposes of illustration, this device will be assumed to be connected into a refrigeration system in which the inlet leads from the condenser and the outlet 34 is connected into the evaporator. The bulb 17 will be disposed adjacent the outlet of the evaporator so as to respond to the temperature at that point.

As the temperature of the bulb increases, indicating excessive temperature at the outlet of the evaporator, and hence insufficient refrigeration, pressure therein will increase and will cause the diaphragm 14 to be moved downwardly against the large coil spring 24. The downward movement of the diaphragm will cause downward movement of the buffer plate 22 and of the projection 54 of the bellows head 53, which is abutted by the buffer plate. Assuming that the bellows 58 is expanded, it will transmit this downward movement to the lower bellows head 57, which, in turn, will move the valve operating stem 66 downwardly against the valve 83 and move the latter in an opening direction, admitting a greater quantity of refrigerant through the valve port 78, which thereby passes into the outlet 34 and thence to the evaporator. In this action, the pressure of the expanded gas within the outlet chamber 94 acts below the diaphragm 14 in opposition to the pressure exerted by the gas from the bulb 17. By this means, the valve 83 maintains a constant superheat in the evaporator in the manner conventional to thermal valves.

The degree of superheat maintained is adjusted by adjusting the screw 41 to raise or lower the cup-shaped abutment member 30, to vary the force exerted by the large coil spring 24. This determines the amount of pressure required by the gas from the bulb 17 to open the valve, and, therefore, changes the superheat value at which the valve operates.

At the time the refrigeration system is first started, as by some external control that starts the compressor motor, any gas trapped within the evaporator is set at a relatively high temperature and pressure. The pressure in the bellows 58 is fixed at a value that will cause the bellows to collapse when this back pressure within the evaporator exceeds a predetermined value. In so collapsing, the bellows 58 will draw the lower head 57 upwardly and permit the valve 83 to be closed by the spring 84 despite the fact that the high temperature of the bulb 17 has the diaphragm in a depressed and expanded condition. The compressor, therefore, is not required to start against this high pressure from the evaporator. As the compressor comes up to speed, it will draw the gas from the evaporator, thus reducing the pressure to below the critical value, and permitting the bellows 58 to expand again. It will open the valve after relief of this pressure.

By the foregoing means, the compressor can come up to speed without an overload occasioned by the high pressure in the evaporator at the start.

It will be seen that this overload protection does not interfere with the normal operation of the thermal valve. Once the excessive back pressure is reduced, the bellows acts merely as a force transmitting means because its length is constant as determined by the size of the cup 52 which holds the lower head 57 against further downward movement. Also, the usual precautions that are required in installing gas-charged valves are eliminated by the present invention.

The cut-off point is unaffected by the superheat setting because the pressure within the bellows 58 remains constant despite movements of the diaphragm in response to the fluid pressure generated at the bulb 17.

The superheat adjustment is entirely independent of the cut-off pressure-responsive means. It is also accessible from the outside of the valve.

The parts may be very readily assembled. The assembly of the thermal valve unit is performed by providing the housing 10 with the superheat adjustment parts, including the screw 41 and the fitting 40. The cup member 30, to hold the main coil spring 24, is inserted in place. The button 36 is then soldered into the wall of the housing through the slot 35 of the member 30. The disc 25, the ring 13, the buffer plate 22, the diaphragm 14 and the backing plate 15 are then installed, and the diaphragm sealed into position with the tube 16 projecting therefrom. The cap assembly is finally installed to complete the thermal unit, which, it may be seen, is one in which all the parts are held together.

The cut-off capsule unit may be separately assembled, including the cup member 52, the bellows heads, the bellows under pressure, and the valve operating stem. This unit fits through the bottom of the cylinder 49. When the capsule unit is slipped into place, it is held there by the fingers 27 on the disc 25. The spring 75 is installed against the cup 52, and the valve unit, consisting of the plug 73, the insert 76, the valve 83, the spring 84, and the cap 82, is slipped into the cylindrical fitting 49, against the shoulder 50.

The strainer assembly is disposed in proper location, and, as soon as the inlet fitting 91 is threaded into place, the whole mechanism is held in assembled relationship.

The valve may be initially calibrated by threading the valve operating stem 65 more or less into the lower head 57 of the bellows. The valve seat is independently adjustable by moving the insert 76 in the plug 73. The action of the inlet fitting 91 against the washer 87 and through the spring washer 86 acts to hold the plug 73 in place against the shoulder 50. The valve insert 76 is properly located within the plug 73 at the time of the assembly of this unit, and is then locked with solder at the lower end of the threaded joint. The solder also seals the threaded joint against leakage.

Where it is desired to provide only the ordinary thermal valve without the pressure-responsive cut-off, the mechanism of Fig. 3 may be substituted for the bellows assembly, including the cup 52. This may be readily done with the present structure, either in initial assembly or as a substitution during the course of the use of the thermal valve. To this end, the inlet fitting 91, the valve unit and the capsule unit are disassembled. Thereupon, the mechanism of Fig. 3 is installed in place of the capsule unit, and the remainder of the reassembly is the same as previously described.

It will be seen from the foregoing that this device accomplishes the objects set forth at the outset of this description to provide a very flexible, readily assembled valve structure. It effects shortening of the valve stem without affecting the superheat setting.

What is claimed is:

1. In a valve construction, a housing having an enlarged portion and inwardly extending wall portion at the end of the enlarged portion, mechanism within the housing including a valve, an expansible chamber having a movable wall in the enlarged portion, a collapsible unit of predetermined limited, normal expansion interposed between the valve and the wall for transmitting movements of the wall to the valve, resilient force means in the enlarged portion acting on the wall independently of the collapsible unit in yieldable opposition to movements of the wall, abutment means including an inwardly extending flange portion supporting the force means, the abutment means extending across the inwardly extending wall portion of the housing, and means mounted on and extending through the inwardly extending wall portion for access from outside the housing, engageable with said wall portion at the flange portion inwardly of the outer extremes of the abutment means for adjusting the abutment means to vary the force applied by the force means.

2. In a valve construction, a housing, an inlet and an outlet, a valve in the housing, to control flow from the inlet to the outlet, an expansible chamber having a movable wall spaced from the valve, said wall being subjected to different fluid pressures on its opposite sides, resilient means in the housing yieldably opposing movement of the diaphragm in one direction, an opening through the housing separated from the expansible chamber, a collapsible, normally expanded pressure-responsive force-transmitting member insertable through the opening for disposition between the movable wall and the valve, and means to close the opening.

3. In a valve construction, a housing, an inlet and an outlet, a valve in the housing, to control flow from the inlet to the outlet, an expansible chamber having a movable wall spaced from the valve, said wall being subjected to different fluid pressures on its opposite sides, resilient means in the housing yieldably opposing movement of the diaphragm in one direction, an opening through the housing separated from the expansible chamber, a force-transmitting member insertable through the opening for disposition between the movable wall and the valve, and means to close the opening, said force-transmitting member comprising a non-expansible frame, a collapsible container within the frame normally expanded to the limit provided by the frame, said force being transmitted through the frame and the collapsible container.

4. In a valve construction, a housing, an inlet and an outlet, a valve in the housing, to control flow from the inlet to the outlet, an expansible chamber having a movable wall spaced from the valve, said wall being subjected to different fluid pressures on its opposite sides, resilient means in the housing yieldably opposing movement of the diaphragm in one direction, an opening through the housing separated from the expansible chamber, a flexible holding means within the housing, a force-transmitting member insertable through the opening and engageable with the holding means when in proper place, during assembly, and means to hold the several parts together in final operating relation.

5. In a valve, a housing, an expansible chamber within the housing having a wall movable in two opposite directions, said housing having an opening opposite the movable wall, a force-transmitting member insertable through the opening into position to be operated by the wall, a valve operating member associated with the force-transmitting member, valve port plug means adapted to be secured across the opening to divide the housing into inlet and outlet chambers, holding means supported by the plug means to hold the force-transmission means in place, a valve contained within the plug means to be operated by the valve operating member, and means to close the housing opening and the inlet chamber thereof.

6. In a valve, a housing, an expansible chamber within the housing having a wall movable in two opposite directions, said housing having an opening opposite the movable wall, a force-transmitting member insertable through the opening into position to be operated by the wall, a valve operating member associated with the force-transmitting member, valve port plug means adapted to be secured across the opening to divide the housing into inlet and outlet chambers, holding means supported by the plug means to hold the force-transmission means in place, a valve contained within the plug means to be operated by the valve operating member, and means to close the housing opening and the inlet chamber thereof, said closure means comprising a valve port fitting having a passage therethrough.

7. In a valve, a housing, an expansible chamber within the housing having a wall movable in two opposite directions, said housing having an opening opposite the movable wall, a force-transmitting member insertable through the opening into position to be operated by the wall, a valve operating member associated with the force-transmitting member, valve port plug means adapted to be secured across the opening to divide the housing into inlet and outlet chambers, holding means supported by the plug means to hold the force-transmission means in place, a valve contained within the plug means to be operated by the valve operating member, and means to close the housing opening and the inlet chamber thereof, said valve being within the inlet chamber, means in the inlet chamber urging the valve in one direction, and said valve operating member being adapted to engage the valve opposite said means to move the valve in the other direction.

8. In a valve, a housing, an expansible chamber within the housing having a wall movable in two opposite directions, said housing having an opening opposite the movable wall, a force-transmitting member insertable through the opening into position to be operated by the wall, a valve operating member associated with the force-transmitting member, valve port plug means adapted to be secured across the opening to divide the housing into inlet and outlet chambers, holding means supported by the plug means to hold the force-transmission means in place, a valve contained within the plug means to be operated by the valve operating member, and means to close the housing opening and the inlet chamber thereof, said force-transmitting means comprising a frame member of predetermined length in the direction of movement of the wall, a head adapted to abut the frame but movable oppositely therefrom, and a collapsible capsule connected to the head and normally holding the same against the frame.

9. In a valve construction, a unit comprising a housing having opposite first and second openings therein, means including an expansible chamber closing the first end of the housing, the chamber having a movable wall facing the second opening, a coil spring contained within the housing and acting at one end in opposition to the movable wall, means on the housing to support the opposite end of the spring, said spring being coaxial with the second opening and providing a medial space within itself accessible from the second opening to the expansible chamber, a force-transmitting means insertable through the second opening for engagement with the movable wall in said medial space, a member removably engageable into the second opening to hold the transmitting means in the housing, and valve means in the housing adjacent the force-transmitting means for operation by the expansible chamber.

10. In a valve construction, a unit comprising a housing having opposite first and second openings therein, means including an expansible chamber closing the first end of the housing, the chamber having a movable wall facing the second opening, a coil spring contained within the housing and acting at one end in opposition to the movable wall, means on the housing to support the opposite end of the spring, said spring being coaxial with the second opening and providing a medial space within itself accessible from the second opening to the expansible chamber, and removable means held together with the movable wall by the spring and extending down within the medial space of the spring to provide lateral limiting means defining a second unit-receiving space, said means having elements for frictional engagement with a second unit for movement therewith.

11. In a valve construction, a unit comprising a housing having opposite first and second openings therein, means including an expansible chamber closing the first end of the housing, the chamber having a movable wall facing the second opening, a coil spring contained within the housing and acting at one end in opposition to the movable wall, means on the housing to support the opposite end of the spring, said spring being coaxial with the second opening and providing a medial space within itself accessible from the second opening to the expansible chamber, and means held together with the movable wall and extending down within the medial space of the spring to provide lateral limiting means defining a second unit-receiving space, said last-named means comprising a plurality of laterally yieldable arms depending into the space within the spring.

12. In a valve construction, a unit comprising a housing having opposite first and second openings therein, means including an expansible chamber closing the first end of the housing, the chamber having a movable wall facing the second opening, a coil spring contained within the housing and acting at one end in opposition to the movable wall, means on the housing to support the opposite end of the spring, said spring being coaxial with the second opening and providing a medial space within itself accessible from the second opening to the expansible chamber, a normally expanded, pressure collapsible valve operating and force-transmitting unit insertable into the housing through the second opening, closure means including a valve port and seat, for attachment across the second opening, and a valve cooperable with the valve seat and engageable by the valve operating means.

13. In a valve construction, a unit comprising a housing having opposite first and second openings therein, means including an expansible chamber closing the first end of the housing, the chamber having a movable wall facing the second opening, a coil spring contained within the housing and acting at one end in opposition to the movable wall, means on the housing to support the opposite end of the spring, said spring being coaxial with the second opening and providing a medial space within itself accessible from the second opening to the expansible chamber, means held together with the movable wall and extending down within the medial space of the spring to provide lateral limiting means defining a second unit-receiving space, a force-transmitting and valve operating unit insertable into the housing through the second opening, for disposition between the lateral limiting means, the said unit being engageable with the movable wall for movement therewith, closure means including a valve port and seat for attachment across the second opening, and a valve cooperable with the seat and operated by the valve operating means.

14. In a valve construction, a unit comprising a housing having opposite first and second openings therein, means including an expansible chamber closing the first end of the housing, the chamber having a movable wall facing the second opening, a coil spring contained within the housing and acting at one end in opposition to the movable wall, means on the housing to support the opposite end of the spring, said spring being coaxial with the second opening and providing a medial space within itself accessible from the second opening to the expansible chamber, a second unit insertable into the housing through the second opening, and comprising a normally expanded, pressure collapsible force-transmission means disposable within the medial space of the spring for engagement with the movable wall, and a valve operating member thereon, a third unit comprising partition means secured across the second opening, said partition means having a valve port therethrough, a valve seat, a valve cooperable with said port and movable by the valve operating means, and means providing a fluid passage to the valve.

15. In a valve construction, a unit comprising a housing having opposite first and second openings therein, means including an expansible chamber closing the first end of the housing, the chamber having a movable wall facing the second opening, a coil spring contained within the housing and acting at one end in opposition to the movable wall, means on the housing to support the opposite end of the spring, said spring being coaxial with the second opening and providing a medial space within itself accessible from the second opening to the expansible chamber, a second unit insertable into the housing through the second opening, and comprising a normally expanded, pressure collapsible force-transmission means disposable within the medial space of the spring for engagement with the movable wall, and a valve operating member thereon, a third unit comprising partition means secured across the second opening, said partition means having a valve port therethrough, a valve seat, a valve cooperable with said port and movable by the valve operating means, in one direction, resilient means in the partition means urging the valve in the other direction, said partition means dividing the housing into inlet and outlet chambers, and a closure for the inlet chamber outside the partition means, and means providing a fluid passage to the valve.

16. In a valve construction, a housing having an expansible wall therein, an inlet and an outlet in the housing, valve means in the housing for operation by the expansible wall, an opening through the housing, a normally expanded, pressure collapsible force-transmitting means insertable into the housing through the opening, means to hold the force-transmitting means between the expansible wall and the valve and a removable closure for the housing opening.

17. In a valve construction, a housing having an expansible wall therein, an inlet and an outlet in the housing, valve means in the housing for operation by the expansible wall, an opening through the housing, a normally expanded, pressure collapsible force-transmitting means insertable into the housing through the opening, means to hold the force-transmitting means between the expansible wall and the valve, and a removable closure for the housing opening, the opening being opposite the expansible wall, and the valve means being removably mounted in the opening.

18. In a valve construction, a housing having an expansible wall therein, an inlet and an outlet in the housing, valve means in the housing for operation by the expansible wall, an opening through the housing, a normally expanded, pressure collapsible force-transmitting means insertable into the housing through the opening, means including a member removably engageable in the opening to hold the force-transmitting means between the expansible wall and the valve means, the member having a passage therethrough, and means mounting the valve means in the passage, for removal from the casing therethrough.

19. In a valve construction, a houing, an expansible movable wall therein, valve means in the housing to control flow therethrough, a collapsible force-transmitting means, means supporting the force-transmitting means in the housing in connection with the wall for movement therewith, an opening in the housing through which the force-transmitting means may be removed, and means removably supporting the valve means in the housing for operation by the force-transmitting means, the valve means being removable independently of the force-transmitting means, and the force-transmitting means being removable without disassembly of the valve means.

20. In a valve construction, a housing, a movable wall therein movable back and forth in a predetermined path, a force-transmitting means, an opening in the housing through which said means may be inserted means to close the opening, a laterally yieldable, flexible holding means connected with the wall and yieldingly engageable with the force-transmitting means to yieldably hold the same connected with the wall, and valve means in the housing including a valve engaged with the force-transmitting means for operation by the movable wall.

21. In a valve construction, a housing, a movable wall therein movable back and forth in a predetermined path, a force-transmitting means, an opening in the housing through which said means may be inserted, means to close the opening, a laterally yieldable, flexible holding means connected with the wall and yieldingly engageable with the force-transmitting means to yieldably hold the same in engagement with the wall, said flexible means being frictionally engageable with the force-transmitting means, the last named means being removable therefrom in one direction, spring means to hold the force-transmitting means against removal in that direction, and valve means in the housing including a valve in engagement with the force-transmitting means for operation by the movable wall.

22. In a valve construction, a housing, an expansible movable wall therein, spring means in the housing to oppose movement of the wall, a normally expanded, pressure collapsible force-transmitting means, an opening through the housing through which the force-transmitting means may be inserted, means to close the opening, valve means in the housing to control flow therethrough, the force-transmitting means being disposed between the movable wall and the valve means to cause the valve means to operate upon movements of the wall, the force means and the spring means being separately and independently connected with the movable wall, for removal of the force-transmitting means independently of the spring means.

GEORGE D. BOWER.

REFERENCES CITED

The following references are of record in the file of this patent:

UNITED STATES PATENTS

| Number | Name | Date |
|---|---|---|
| 2,201,728 | Hoesel | May 21, 1940 |
| 2,209,216 | Wile | July 23, 1940 |
| 2,231,163 | Johnson | Feb. 11, 1941 |
| 2,258,295 | Merz | Oct. 7, 1941 |